United States Patent [19]

Krüger et al.

[11] Patent Number: 5,426,165
[45] Date of Patent: Jun. 20, 1995

[54] THERMOPLASTIC FLUOROCOPOLYMERS AND THE FLUOROMONOMERS USED FOR THEIR PREPARATION

[75] Inventors: Ralf Krüger, Köln; Karl-Erwin Piejko, Bergisch Gladbach; Michael Negele, Solingen; Ulrich Eisele; Albrecht Marhold, both of Leverkusen, all of Germany

[73] Assignee: Bayer Aktiengesellschaft, Leverkusen, Germany

[21] Appl. No.: 240,770

[22] PCT Filed: Nov. 6, 1992

[86] PCT No.: PCT/EP92/02557

§ 371 Date: May 12, 1994

§ 102(e) Date: May 12, 1994

[87] PCT Pub. No.: WO93/10160

PCT Pub. Date: May 27, 1993

[30] Foreign Application Priority Data

Nov. 19, 1991 [DE] Germany .................. 41 37 967.5

[51] Int. Cl.⁶ .................. C08F 214/18; C08F 216/14

[52] U.S. Cl. .................................................. 526/247
[58] Field of Search ............... 526/247; 568/615, 674

[56] References Cited

U.S. PATENT DOCUMENTS 3,274,239  9/1966  Selman .

FOREIGN PATENT DOCUMENTS 4137967  5/1993  Germany .................. 526/247

Primary Examiner—Joseph L. Schofer
Assistant Examiner—N. Sarofim
Attorney, Agent, or Firm—Sprung Horn Kramer & Woods

[57] ABSTRACT

The present invention relates to fluoropolymers with improved temperature resistance and dimensional stability in the heat based on fluoroethylenes, using perfluoro-(cycloalkyl-vinyl ethers) and optionally other monomers as comonomers. The invention also relates to the perfluor-(cycloalkyl-vinyl ethers) which impart the advantageous thermal properties to the fluoropolymers according to the invention.

2 Claims, No Drawings

THERMOPLASTIC FLUOROCOPOLYMERS AND THE FLUOROMONOMERS USED FOR THEIR PREPARATION

The present invention relates to fluoropolymers with improved temperature resistance and dimensional stability in the heat based on fluoroethylenes, for which perfluoro-(cycloalkyl-vinyl ethers) and optionally other monomers are used as comonomers. The present invention also relates to the perfluoro-(cycloalkyl-vinyl ethers) which impart the advantageous thermal properties to the fluoropolymers according to the invention.

Fluoropolymers are used in technology whenever special properties are required, such as low surface tension, high resistance to chemicals, oils or solvents or extreme resistance to (heat) ageing.

Polytetrafluoroethylene (PTFE), which is the most mass produced synthetic resin in the field of fluoropolymers, combines the above-mentioned properties to an eminent degree but, as is well known, cannot be processed thermoplastically. An improvement in the thermoplastic processibility is obtained by the introduction of comonomers which lower the viscosity of the polymer above the softening point (melting point in partially crystalline systems) and thus improve the melt flow. Hexafluoropropene and perfluorinated acyclic alkyl-vinyl ethers (U.S. Pat. No. 3,180,895) are examples of such comonomers but the introduction of such comonomers in most cases lowers the softening point of the copolymer so that the thermoplastic processibility is obtained at the expense of the temperature stability of the polymer.

Other fluorine-containing homopolymers, such as polyvinylidene fluoride or polychlorotrifluoroethylene, can be processed thermoplastically but owing to their low fluorine content they frequently do not reach the level in the above mentioned properties which is achieved by the most highly fluorinated (co)polymers.

It is an object of the present invention to provide new thermoplastically processible fluorocopolymers with increased resistance to temperature and dimensional stability in the heat based on fluorine-containing ethylenes as one of the comonomers.

It has been found that thermoplastic copolymers with increased temperature resistance and dimensional stability in the heat can be produced by the copolymerisation of fluorine-containing ethylenes with perfluoro-(cycloalkylvinyl ethers) corresponding to the following formula I.

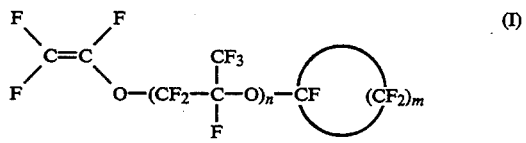

n=0, 1 or 2,
m=3, 4 or 5.

Other comonomers may also be used for copolymerisation to modify the properties of the fluorocopolymers according to the invention. These other comonomers include in particular straight chain or branched C$_3$- to C$_8$-alkenes having at least one fluorine atom or fluorine-free ethylene or propylene.

The present invention thus relates to thermoplastic fluorocopolymers obtained by the copolymerisation of a) from 99.5 to 50 mol-% of at least one ethylene having 1 to 4 fluorine atoms and b) from 0.5 to 50 mol-% of at least one perfluoro-(cycloalkyl-vinyl ether) corresponding to formula I and c) from 0 to 40 mol-% of at least one other comonomer selected from ethylene, propylene and straight chain or branched C$_3$- to C$_8$-alkenes containing at least one fluorine atom.

The molar ratio of fluoroethylenes to perfluoro-(cycloalkyl-vinyl ethers) in the fluorocopolymers according to the invention is preferably from 1 to 50, most preferably from 2 to 20.

The ethylenes containing at least one fluorine atom (component a)) may be tetrafluoroethylene, trifluoroethylene, vinylidene fluoride, monofluoroethylene or chlorotrifluoroethylene. Tetrafluoroethylene and vinylidene fluoride are preferred.

Among the perfluoro-(cycloalkyl-vinyl ethers) of formula I, those in which n=0 are preferred. Perfluoro-(cyclopentyl-vinyl ether), i.e. the compound according to formula I in which n=0 and m=4, is particularly preferred for the invention.

The perfluoro-(vinyl-cycloalkyl)-ethers according to the invention are prepared from 2-cycloalkoxy-propane carboxylic acid fluorides (obtainable according to U.S. Pat. No. 3,274,239). They may be obtained by conversion into their alkali metal salts followed by decarboxylation at 170° to 250° C., as described in U.S. Pat. No. 3,274,239. If this process is employed, however, considerable quantities of 1,1,1,2-tetrafluoro-ethylcycloalkyl ethers are formed as by-products which are difficult to remove and only with high losses in yield. Residues of such by-products seriously interfere with the copolymerisation and lead to fluorocopolymers with unsatisfactory mechanical and thermal properties. The said difficulties of producing perfluoro-(cycloalkyl-vinyl ethers) in a form suitable for copolymerisation with fluoroethylenes must be regarded as the reason why they have hitherto not been used in fluoropolymers.

It has now been found that 2-cycloalkoxy-propane carboxylic acid fluorides can be converted into a form of perfluoro-(vinyl-cycloalkyl)-ethers suitable for the preparation of fluoro copolymers by employing a process analogous to that disclosed in EP-A 260 773.

According to the invention, the perfluoro-(cycloalkylvinyl ethers) corresponding to formula (I) to be used for the copolymerisation are prepared from the corresponding 2-cycloalkoxy-propane carboxylic acid fluorides corresponding to the following formula II

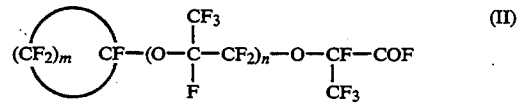

by slowly heating these to a temperature of from 110°–140° C. in a suitable solvent containing a salt-forming agent in the presence of a catalytic quantity of N,N-dimethylformamide, withdrawing a distillate corresponding to a condensation temperature of from 60° to 90° C. at a temperature of 100° to 120° C. and redistilling the distillate at normal pressure.

The solvent used is preferably diglyme (diethylene glycol dimethylether). The salt-forming agent used is preferably anhydrous potassium carbonate. The salt-forming agent is preferably used in a 1.1–1.3 molar excess, based on the perfluoro-2-cycloalkoxy-propane carboxylic acid fluoride. Dimethylformamide is preferably used in quantities of from 1–5% by weight, based on the solvent. It is essential to operate under absolutely anhydrous conditions.

To produce the copolymers according to the invention, the known radical processes known for the copolymerisation of fluorine-containing monomers may be employed. The copolymerisation may be carried out in solution, suspension or emulsion (U.S. Pat. No. 2,968,649; U.S. Pat. No. 3,051,677; U.S. Pat. No. 3,053,818; U.S. Pat. No. 3,331,823; U.S. Pat. No. 3,335,106 containing examples of suitable reaction media and general reaction conditions). Basically well known compounds suitable for the particular reaction medium are used for initiating the radical copolymerisation. Thus the compounds used for solution or suspension polymerisation may be organic, oil-soluble peroxides which may also be fluorinated, such as benzoyl peroxide, trifluoroacetyl peroxide or organic soluble azo compounds such as azo-bis-isobutyronitrile. The initiators used for emulsion polymerisation, which is the preferred method for producing the copolymers according to the invention, are water-soluble inorganic percompounds such as persulphates, perborates, percarbonates, etc., generally in the form of their sodium or ammonium salts.

If relatively low temperatures are employed for polymerisation, decomposition accelerators, generally reducing agents, must be used in addition, depending on the polymerisation temperature and on the decomposition constant of the initiator. The following may be used for this purpose: Sulphur compounds such as sodium sulphite, sodium pyrosulphite or Rongalit C (sodium formamidine sulphinic acid) or organic reducing agents such as ascorbic acid, metal salts such as iron(II) or cobalt(II) salts, organometallic compounds, etc.

The reaction temperatures for copolymerisation are from $-15°$ C. to $+120°$ C., preferably from 20° to 90° C.

Chain transferers such as methanol, isopropanol, isopentane, ethyl acetate, diethylmalonate or carbon tetrachloride may be used if necessary for adjusting the molecular weight of the polymers as they are being produced.

It is a further characteristic of the process according to the invention that copolymerisation is carried out at an elevated pressure. This pressure should be at least 5 bar but need not exceed 100 bar.

From 5 to 65 bar is a preferred range for the process according to the invention.

The copolymers according to the invention may be produced batchwise but are preferably produced by a semi-continuous or a continuous process.

Linear copolymers having molecular weights of from $10^3$ to $10^6$ g/mol are obtained.

The invention will now be described in more detail with the aid of the following Examples:

EXAMPLE 1 a) Preparation of Perfluoro-2-cyclopentoxy-propane carboxylic acid fluoride 150 g (2.59 mol) of annealed potassium fluoride are suspended in 500 ml of diglyme and 456 g (2.0 mol) of octafluorocyclopentanone are incorporated by condensation at about 5° C. within 1 hour with stirring. When the slightly exothermic reaction has died down, the reaction mixture is again cooled to about 5° C. and hexafluoropropene oxide is introduced so rapidly that only slight reflux occurs at the dry ice condenser. When 330 g (1.99 mol) of hexafluoropropene oxide have been introduced (about 60 g/h), stirring is continued for 1 hour at 5° C. and overnight at room temperature.

The product is then distilled off at reduced pressure (up to 20 mbar) (bp. up to 60° C.) and a diphasic distillate is collected in the cooled receiver. The upper phase contains about 90% of diglyme and the lower phase (about 80% of product) may be transferred to the next stage without further purification.

To characterise the crude product (lower phase) and determine the yield, it is redistilled through a short column at normal pressure.

b) Conversion into Perfluorocyclopentyl Vinyl Ether 175 g (1.26 mol) of pulverulent anhydrous potassium carbonate and 3 ml of dimethylformamide are introduced into 200 ml of absolute diglyme and 394 g (1.0 mol) of perfluoro-2-cyclopentoxy-propane carboxylic acid fluoride are added dropwise at room temperature in 1 hour. The reaction mixture is slightly exothermic (up to about 35° C.). When all the reactants have been added together, the reaction mixture is slowly heated to 60° C., 80° C. and 110° C. (in each case about 1 hour, light reflux and liberation of $CO_2$ from 80° C. upwards, and a distillate can be drawn off via a bridge, starting at 110° C.). The sump temperature is raised to a maximum of 130° C. and the head temperature of the distillate fluctuates from 65°–85° C. The crude product (280 g) is redistilled through a 40 cm column at normal pressure:

Main fraction $Bp_{1013}$: 80°–82° C.

Yield: 255 g (78% of theory).

(GC-)MS: $m/e = 328$ (molar peak).

$19_{F\text{-}NMR}: \delta =$

- $-35.0$ ppm (2d, 1F, $J_{F\text{-}F} = 83$ and 65 Hz, CF=C—O cis);
- $-42.1$ ppm (4 m, 1F, $J_{F\text{-}F} = 111.83$ and 6 Hz, CF=C—O trans);
- $-51.1$ ppm (pseudo-quartet (higher order AA'BB'-system), 4F, "J"=258 Hz, $2CF_2$);
- $-52.5$ ppm (pseudo-quartet (higher order AA'BB'-system), 4F, "J"=258 Hz, $2CF_2$);
- $-56.5$ ppm (4m, 1F, $J_{F\text{-}F} = 111.65$ and 6 Hz, =CFO) and
- $-58.8$ ppm (m, 1F, OCF) (against external $CF_3COOH$).

The proportion of 1,1,1,2-tetrafluoroethylperfluorocyclopentyl vinyl ether is less than 2% according to GC.

The perfluoro-(cyclopentyl vinyl ether) prepared according to this Example was used in polymerisation Examples 3, 4, 5 and 6.

COMPARISON EXAMPLE 1b

Conversion analogous to the process according to U.S. Pat. No. 3,274,239.

394 g (1.0 mol) of perfluoro-2-cyclopentoxy-propane carboxylic acid fluoride are dissolved in 300 ml of dioxane and made alkaline to phenol phthalein with 40.5 g of sodium hydroxide in 100 ml of $H_2O$. The solvent is then removed in a water jet vacuum and the salt left behind is dried. The dry salt is then decomposed by heat (170°–250° C.) in an oil pump vacuum (0.3 mbar) and the reaction gases are condensed in a trap which is cooled to $-78°$ C.

This crude product (295 g) has a GC purity of 55% (45% 1,1,1,2-tetrafluoroethyl-trifluorovinyl ether) and cannot be enriched beyond 90% by distillation.

A polymerisation experiment carried out with the crude product and with the enriched product resulted in very low yields of discoloured products, as shown in Comparison Example 6.

EXAMPLE 2

Preparation of perfluorocyclobutyl vinyl ether 69 g (0.2 mol) of perfluoro-2-cyclobutoxy-propane carboxylic acid fluoride (prepared from perfluorocyclobutanone and hexafluoropropene oxide analogously to Example 1a), the perfluorocyclobutanone having been obtained according to J. Chem. Soc. 7370 (1965) from 1-methoxy-pentafluorocyclobutyl-1-ene and elementary fluorine followed by hydrolysis of the methyl-cyclo-butyl ether) are reacted with $K_2CO_3$ analogously to Example 1b).

Yield: 41 g of Perfluorobutyl vinyl ether = 74% of theory $Bp_{ND}$: 59°–60° C.

Amount of 1,1,1,2-tetrafluoroethyl-perfluorocyclobutyl ether <3% according to GC/MS.

EXAMPLE 3

Preparation of a Vinylidene fluoride/perfluoro-(cyclopentyl vinyl ether) copolymer 250 ml of deionised water were introduced into a 0.7 litre autoclave. 3.9 g of sodium perfluoro-octanoate and 3.0 g of potassium peroxydisulphate were then dissolved therein. The resulting solution was adjusted to a pH of about 10 by means of sodium hydroxide. The sealed autoclave was then subjected three times to a nitrogen pressure of 10 bar and subsequently released to normal pressure.

36 g of perfluoro-(cyclopentyl-vinyl ether) and 64 g of vinylidene fluoride were introduced into the autoclave and the reaction mixture was heated to 50° C. with stirring. After a reaction time of one hour at this temperature, 50 ml of an aqueous solution containing 1 g of ascorbic acid, 5 mg of iron(II) sulphate and 1.5 g of sodium hydroxide began to be pumped in at a uniform rate over a period of 10 hours. At the end of this time, during which the reaction pressure fell from 42 bar to 13 bar, the contents of the autoclave were cooled and unreacted gas mixture was ventilated off. The reaction mixture thus obtained was poured into 300 ml of a 4% aqueous magnesium sulphate solution for complete coagulation. The product was washed with water and then dried. 81 g of a white powder was obtained which was identified as a copolymer consisting of units of vinylidene fluoride and perfluoro(cyclopentyl vinyl ether). The copolymer is soluble in dimethyl formamide and dimethyl acetamide. The limiting viscosity is 0.2 dl/g (DMF, 25° C.). The molar ratio of vinylidene fluoride to perfluoro-(cyclopentyl-vinyl ether) in the copolymer was determined by $^{19}F$ nuclear resonance spectroscopy and found to be 91:9.

The following chemical shifts were found and evaluated in dimethyl formamide-$d_7$ against trifluoroacetic acid as standard:

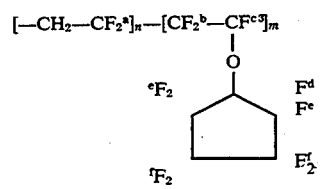

a: −14; −16; −17; −46 ppm
b: −42 ppm
c: −43 ppm
d: −52 ppm
e,e': −30; −35; −53; −59 ppm
f,f': −32; −38; −49; −55 ppm

COMPARISON EXAMPLE 3

Preparation of a vinylidene fluoride/perfluoro-(n-propylvinyl ether) copolymer 32 g of perfluoro-(n-propyl-vinyl ether) and 68 g of vinylidene fluoride were copolymerised by a method analogous to that described in Example 3. 72 g of a copolymer consisting of units of vinylidene fluoride and perfluoro-(n-propyl-vinyl ether) were isolated. The copolymer is soluble in dimethyl formamide and dimethyl acetamide. The limiting viscosity is 0.81 dl/g (DMF, 25° C.). The chemical composition was determined by $^{19}F$-nuclear resonance spectroscopy. The molar ratio of vinylidene fluoride to perfluoro-(n-propyl-vinyl ether) is 91:9.

EXAMPLE 4

110 ml of deionised water were introduced into a 0.3 litre autoclave. 1.8 g of sodium perfluoro-octanoate were dissolved therein. This solution was adjusted to a pH of about 10 with sodium hydroxide. The sealed autoclave was then three times and subsequently released to normal pressure. 9 g of perfluoro-(cyclopentyl-vinyl ether) and 21 g of vinylidene fluoride were introduced into the autoclave and the reaction mixture was heated to 80° C. with stirring. When this temperature had been reached, 20 g of an aqueous solution containing 0.7 g of ammonium peroxy disulphate were forced into the autoclave. After a total reaction time of 7 hours during which the reaction pressure fell from 38 bar to 15 bar, the autoclave contents were cooled and the unreacted gas mixture was ventilated off. The emulsion thus obtained was poured into 130 ml of a 4% aqueous magnesium sulphate solution for complete coagulation. The product was washed with water and then dried. 19 g of a copolymer (white powder) consisting of units of vinylidene fluoride and perfluoro-(cyclopentyl-vinyl ether) were obtained. The copolymer is soluble in dimethyl formamide and dimethyl acetamide. The limiting viscosity is 0.2 dl/g (DMF, 25° C.). The chemical composition was determined by $^{19}F$-nuclear resonance spectroscopy. The molar ratio of vinylidene fluoride to perfluoro-(cyclopentyl-vinyl ether) is 93:7.

COMPARISON EXAMPLE 4

9.5 g of perfluoro-(n-propyl-vinyl ether) and 20.5 g of vinylidene fluoride were copolymerised by a process analogous to that described in Example 4. 19 g of a copolymer consisting of units of vinylidene fluoride and perfluoro-(n-propyl-vinyl ether) were isolated. The copolymer is soluble in dimethyl formamide and dimethyl acetamide. The limiting viscosity is 0.7 dl/g (DMF, 25° C.). The chemical composition was determined by $^{19}$F-nuclear resonance spectroscopy. The molar ratio of vinylidene fluoride to perfluoro-(n-propyl-vinyl ether) is 92:8.

DSC- and thermogravimetric (TGA) analyses were carried out on the copolymers prepared in accordance with the above-mentioned Examples.

Measurements

TGA—Measuring apparatus TGS-2 (Perkin-Elmer); heating from room temperature to complete decomposition at the rate of 20K/min under nitrogen.

DSC—Measuring apparatus DSC-2 (Perkin-Elmer); heating twice from $-50°$ C. to $+200°$ C. at the rate of 20 K/min under helium (measured values obtained from the 2nd heating).

TABLE 1

| Example | $T_g/°C.$ (DSC) | $T_m/°C.$ (DSC) | Temp./°C. for weight reduction by | | | | | |
|---|---|---|---|---|---|---|---|---|
| | | | 1% | 2% | 3% | 5% | 10% | >90% |
| 3 | −8 | 162 | 280 | 354 | 373 | 389 | 406 | 800 |
| V-3 | −28.5 | 155 | 240 | 250 | 267 | 345 | 381 | 580 |
| 4 | −14 | 150 | 142 | 203 | 228 | 271 | 338 | 900 |
| V-4 | −33 | 148 | 111 | 164 | 213 | 261 | 402 | 672 |

EXAMPLE 5

130 ml of deionised water were introduced into an 0.3-litre autoclave. 0.5 g of lithium perfluorooctane sulphonate were dissolved therein. This solution was adjusted to a pH of about 10 with lithium hydroxide. The sealed autoclave was then subjected three times to a nitrogen pressure of 10 bar and subsequently released to normal pressure. 9.3 g of perfluoro-(cyclopentyl-vinyl ether) and 30 g of chlorotrifluoroethylene were introduced into the autoclave and the reaction mixture was heated to 90° C. with stirring. After this temperature had been reached, 20 g of an aqueous solution containing 0.8 g of potassium peroxydisulphate were forced into the autoclave. After a total reaction time of 1.5 hours during which the reaction pressure fell from 19 bar to 15.5 bar, the contents of the autoclave were cooled and the unreacted gas mixture was ventilated off. The reaction mixture thus obtained was poured into 130 ml of a 4% aqueous magnesium sulphate solution for complete coagulation. The product was washed with water and then dried. 7.5 g of a copolymer consisting of units of chlorotrifluoroethylene and perfluoro-(cyclopentyl-vinyl ether) were obtained. The copolymer is not soluble in dimethyl formamide or dimethyl acetamide.

The following copolymer composition was determined by analyses of the chlorine and fluorine contents:

Chlorotrifluoroethylene/perfluoro-(cyclopentyl-vinyl ether)=95/5 (molar ratio).

EXAMPLE 6

8.9 g of perfluoro-(cyclopentyl-vinyl ether) and 60 g of chlorotrifluoroethylene were copolymerised for 2 hours at 70° C. by a process analogous to that described in Example 5. 26 g of a white powder were isolated. This was identified as a copolymer consisting of units of chlorotrifluoroethylene and perfluoro-(cyclopentyl-vinyl ether).

The following copolymer composition was determined with the aid of analyses of the chlorine and fluorine contents: Chlorotrifluoroethylene/perfluoro-(cyclopentyl-vinyl ether)=98/2 (molar ratio).

COMPARISON EXAMPLE TO EXAMPLE 6

15 g of the perfluoro-(cyclopentyl-vinyl ether), prepared according to Comparison Example 1b, which could only be obtained in 55% purity by this variation of the process, and 60 g of chlorotrifluoroethylene were copolymerised for 6 hours at 70° C. by a process analogous to that described in Example 6. In addition to 0.2 g of a beige coloured coagulate, 11 g of an ochre coloured powder were isolated from the emulsion which contained large quantities of unidentified impurities in addition to the units of chlorotrifluoroethylene and perfluoro-(cyclopentyl-vinyl ether) bound in the copolymer.

| | Example 6 | Comparison Example 6 |
|---|---|---|
| Yield | 43% in 2 h | 22% in 6 h |
| Appearance | white powder | ochre coloured powder + beige coloured coagulate |

We claim:

1. Thermoplastic fluorocopolymers obtained by the copolymerisation of
   a) from 99.5 to 50 mol-% of at least one ethylene having 1 to 4 fluorine atoms and
   b) from 0.5 to 50 mol-% of at least one perfluoro-(cycloalkyl-vinyl ether) corresponding to Formula I

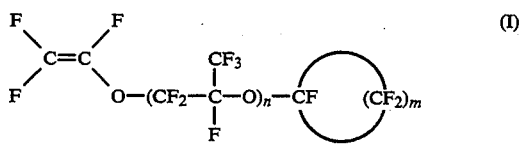

wherein
   n=0, 1 or 2 and
   m=3, 4 or 5 and
   c) from 0 to 40 mol-% of at least one other comonomer selected from ethylene, propylene and straight chain or branched $C_3$- to $C_8$-alkenes containing at least one fluorine atom.

2. A process for the production of thermoplastic fluorocopolymers according to claim 1, characterised in that the perfluoro-cycloalkylvinyl ether of formula I is prepared from the corresponding 2-cycloalkoxy-propane carboxylic acid fluorides corresponding to the following formula II

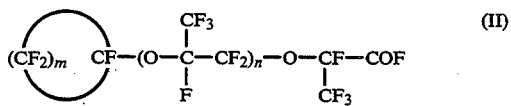

by slowly heating these to a temperature of from 110°–140° C. in a suitable solvent containing a salt-forming agent in the presence of a catalytic quantity of N,N-dimethylformamide, withdrawing a distillate at a temperature starting from 100°–120 ° C. corresponding to a condensation temperature of from 60° to 90° C. and redistilling the distillate at normal pressure.

* * * * *